US012676077B2

(12) United States Patent (10) Patent No.: US 12,676,077 B2
Foias et al. (45) Date of Patent: Jul. 7, 2026

(54) SYSTEMS AND METHODS FOR A COMPUTER-IMPLEMENTED ADAPTIVE LEARNING PATHWAY BUILDER

(71) Applicants: Dara Foias, Tempe, AZ (US); Chandima Cumaranatunge, Peoria, AZ (US); Derek Brennan, Chandler, AZ (US); Denise Diaz, Goodyear, AZ (US); Bethany Weigele, Tempe, AZ (US)

(72) Inventors: Dara Foias, Tempe, AZ (US); Chandima Cumaranatunge, Peoria, AZ (US); Derek Brennan, Chandler, AZ (US); Denise Diaz, Goodyear, AZ (US); Bethany Weigele, Tempe, AZ (US)

(73) Assignee: Arizona Board of Regents on Behalf of Arizona State University, Tempe, AZ (US)

( * ) Notice: Subject to any disclaimer, the term of this patent is extended or adjusted under 35 U.S.C. 154(b) by 578 days.

(21) Appl. No.: 18/127,422

(22) Filed: Mar. 28, 2023

(65) Prior Publication Data

US 2023/0306859 A1    Sep. 28, 2023

Related U.S. Application Data

(60) Provisional application No. 63/324,377, filed on Mar. 28, 2022.

(51) Int. Cl.
*G09B 5/02* (2006.01)

(52) U.S. Cl.
CPC ..................................... *G09B 5/02* (2013.01)

(58) Field of Classification Search
CPC ................................. G09B 5/00; G09B 7/00
See application file for complete search history.

(56) References Cited

U.S. PATENT DOCUMENTS

| | | | |
|---|---|---|---|
| 8,182,270 B2 | 5/2012 | Elzinga et al. | |
| 2003/0163784 A1* | 8/2003 | Daniel .................... | G06F 40/10 |
| | | | 715/201 |
| 2006/0008789 A1* | 1/2006 | Gerteis .................... | G09B 5/00 |
| | | | 434/81 |

* cited by examiner

*Primary Examiner* — Robert J Utama
(74) *Attorney, Agent, or Firm* — Polsinelli PC

(57) ABSTRACT

An intuitive framework for assembling instructional modules for educational purposes provides integrated programmatic logic to provide learners with agency and increase achievement. The framework enables educators to use content from a learning content database and assemble the content into adaptive learning pathways using a visual drag-and-drop approach combined with the creation of rules to drive adaptivity without requiring programming or coding skills.

12 Claims, 15 Drawing Sheets

300

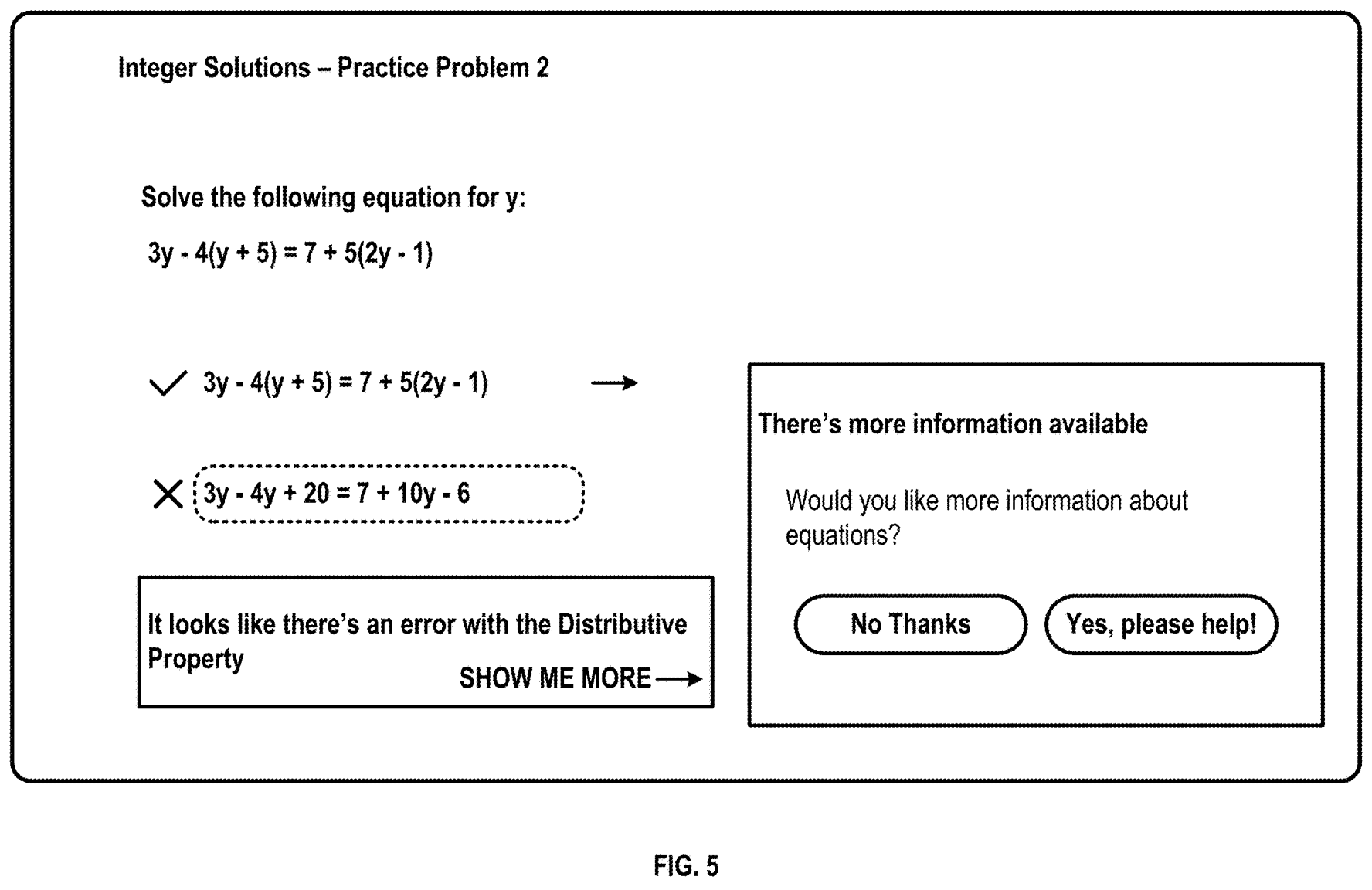

Integer Solutions – Practice Problem 2

Solve the following equation for y:

3y - 4(y + 5) = 7 + 5(2y - 1)

∨   3y - 4(y + 5) = 7 + 5(2y - 1)

✕   3y - 4y + 20 = 7 + 10y - 6

It looks like there's an error with the Distributive Property

SHOW ME MORE ⟶

There's more information available

Would you like more information about equations?

No Thanks     Yes, please help!

FIG. 5

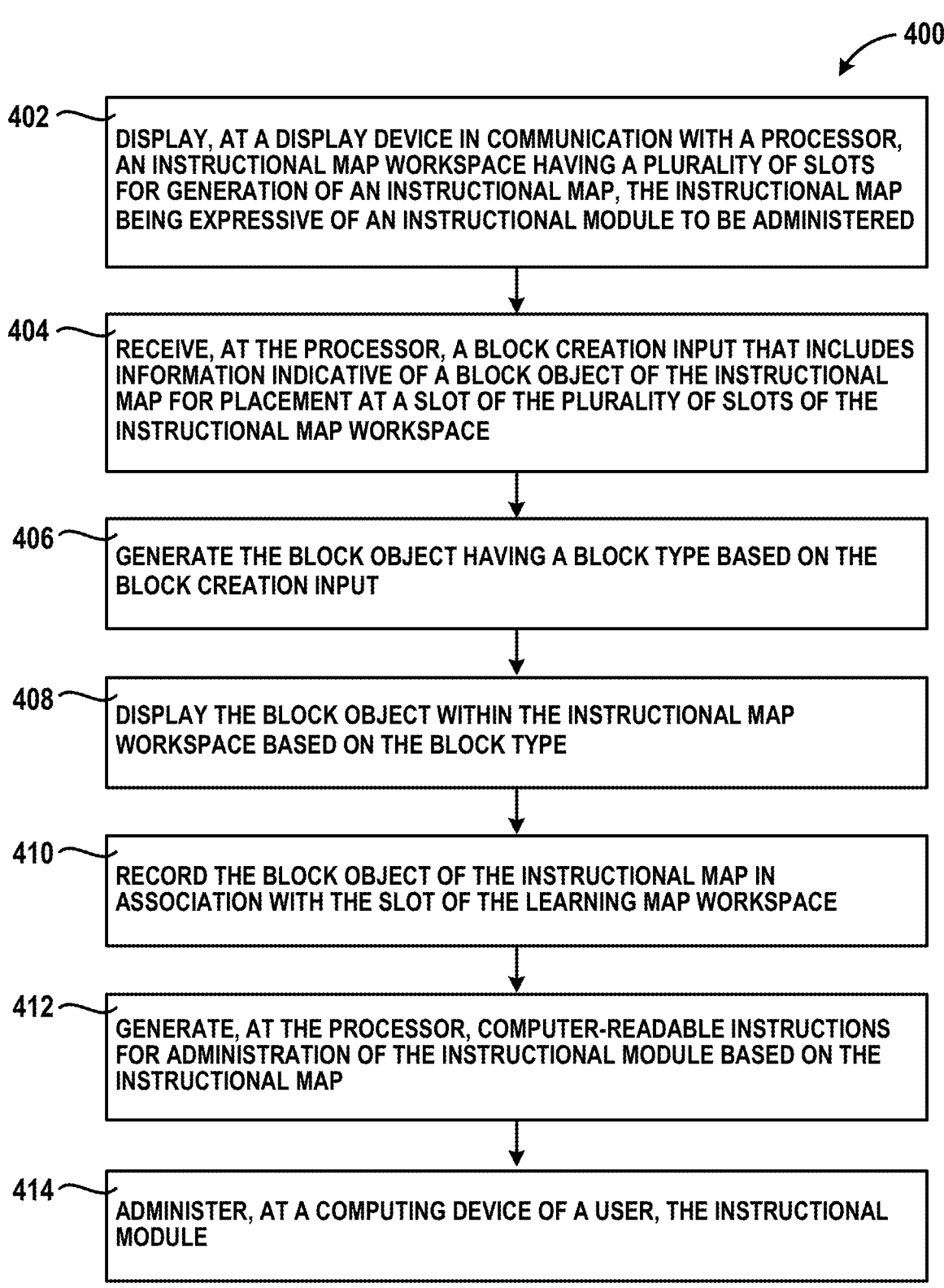

400

402 — DISPLAY, AT A DISPLAY DEVICE IN COMMUNICATION WITH A PROCESSOR, AN INSTRUCTIONAL MAP WORKSPACE HAVING A PLURALITY OF SLOTS FOR GENERATION OF AN INSTRUCTIONAL MAP, THE INSTRUCTIONAL MAP BEING EXPRESSIVE OF AN INSTRUCTIONAL MODULE TO BE ADMINISTERED

404 — RECEIVE, AT THE PROCESSOR, A BLOCK CREATION INPUT THAT INCLUDES INFORMATION INDICATIVE OF A BLOCK OBJECT OF THE INSTRUCTIONAL MAP FOR PLACEMENT AT A SLOT OF THE PLURALITY OF SLOTS OF THE INSTRUCTIONAL MAP WORKSPACE

406 — GENERATE THE BLOCK OBJECT HAVING A BLOCK TYPE BASED ON THE BLOCK CREATION INPUT

408 — DISPLAY THE BLOCK OBJECT WITHIN THE INSTRUCTIONAL MAP WORKSPACE BASED ON THE BLOCK TYPE

410 — RECORD THE BLOCK OBJECT OF THE INSTRUCTIONAL MAP IN ASSOCIATION WITH THE SLOT OF THE LEARNING MAP WORKSPACE

412 — GENERATE, AT THE PROCESSOR, COMPUTER-READABLE INSTRUCTIONS FOR ADMINISTRATION OF THE INSTRUCTIONAL MODULE BASED ON THE INSTRUCTIONAL MAP

414 — ADMINISTER, AT A COMPUTING DEVICE OF A USER, THE INSTRUCTIONAL MODULE

FIG. 6

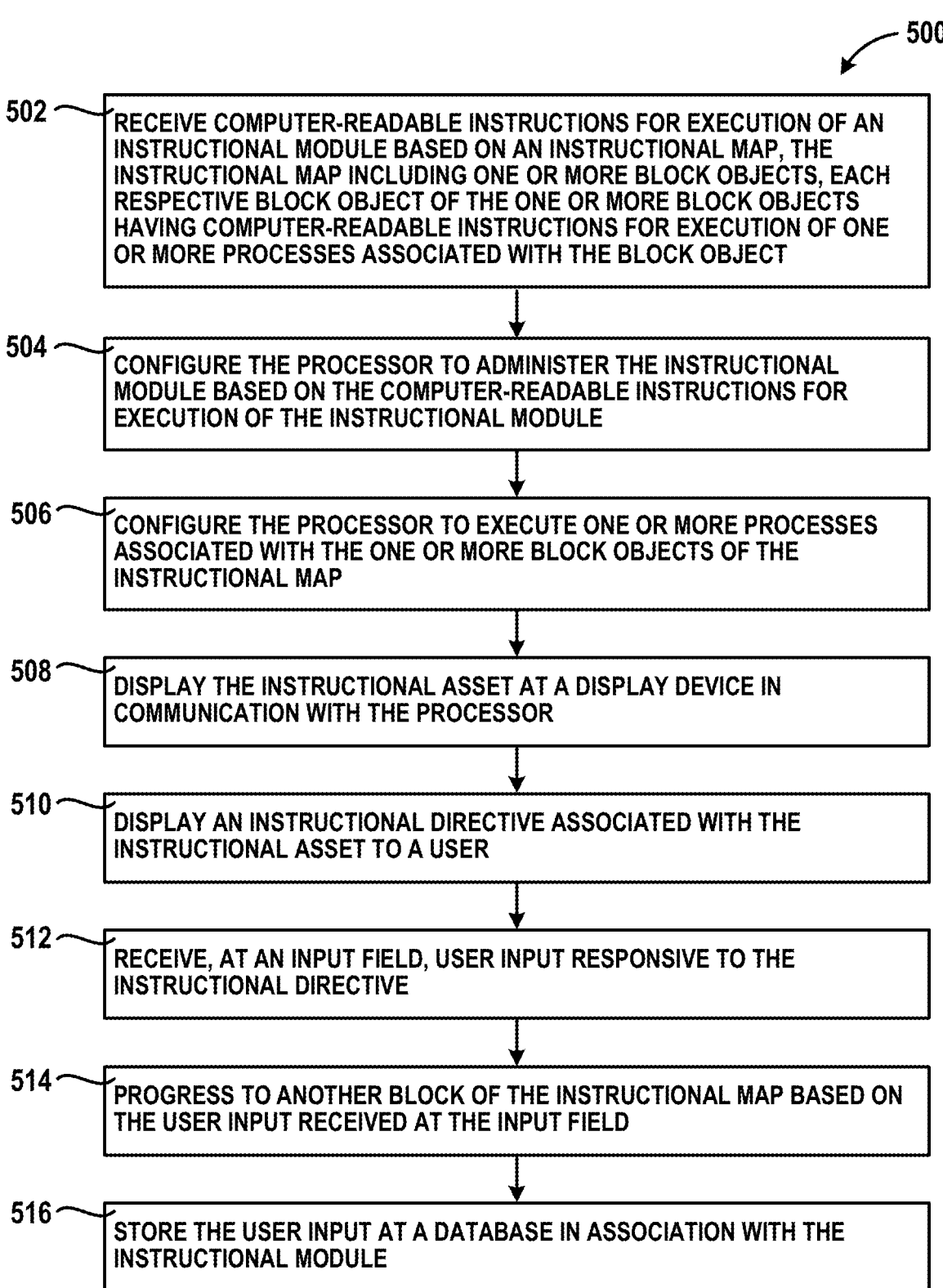

502 — RECEIVE COMPUTER-READABLE INSTRUCTIONS FOR EXECUTION OF AN INSTRUCTIONAL MODULE BASED ON AN INSTRUCTIONAL MAP, THE INSTRUCTIONAL MAP INCLUDING ONE OR MORE BLOCK OBJECTS, EACH RESPECTIVE BLOCK OBJECT OF THE ONE OR MORE BLOCK OBJECTS HAVING COMPUTER-READABLE INSTRUCTIONS FOR EXECUTION OF ONE OR MORE PROCESSES ASSOCIATED WITH THE BLOCK OBJECT

504 — CONFIGURE THE PROCESSOR TO ADMINISTER THE INSTRUCTIONAL MODULE BASED ON THE COMPUTER-READABLE INSTRUCTIONS FOR EXECUTION OF THE INSTRUCTIONAL MODULE

506 — CONFIGURE THE PROCESSOR TO EXECUTE ONE OR MORE PROCESSES ASSOCIATED WITH THE ONE OR MORE BLOCK OBJECTS OF THE INSTRUCTIONAL MAP

508 — DISPLAY THE INSTRUCTIONAL ASSET AT A DISPLAY DEVICE IN COMMUNICATION WITH THE PROCESSOR

510 — DISPLAY AN INSTRUCTIONAL DIRECTIVE ASSOCIATED WITH THE INSTRUCTIONAL ASSET TO A USER

512 — RECEIVE, AT AN INPUT FIELD, USER INPUT RESPONSIVE TO THE INSTRUCTIONAL DIRECTIVE

514 — PROGRESS TO ANOTHER BLOCK OF THE INSTRUCTIONAL MAP BASED ON THE USER INPUT RECEIVED AT THE INPUT FIELD

516 — STORE THE USER INPUT AT A DATABASE IN ASSOCIATION WITH THE INSTRUCTIONAL MODULE

FIG. 7

SYSTEMS AND METHODS FOR A COMPUTER-IMPLEMENTED ADAPTIVE LEARNING PATHWAY BUILDER

CROSS-REFERENCE TO RELATED APPLICATIONS

This is a U.S. Non-Provisional Patent Application that claims benefit to U.S. Provisional Patent Application Ser. No. 63/324,377 filed 28 Mar. 2022, which is herein incorporated by reference in its entirety.

FIELD

The present disclosure generally relates to instructional learning environments, and in particular, to a system and associated method for a computer-implemented framework for building custom adaptive learning environments.

BACKGROUND

Adaptive learning—or adaptive teaching—involves delivering custom learning experiences that provides customized feedback and resources to students, especially in online or computer-implemented learning environments. There exist numerous studies and publications demonstrating the efficacy of adaptive learning experiences. However, the use of adaptive learning experiences is not very common because the creation of such experiences is costly. Creating a custom adaptive learning experience requires programming skills that educators may not have; and buying ready-made adaptive experiences is expensive. The authoring environments of currently available adaptive learning platforms are complex and not very intuitive for educators. This high bar to entry has resulted in the promise of adaptive learning to not be realized.

It is with these observations in mind, among others, that various aspects of the present disclosure were conceived and developed.

BRIEF DESCRIPTION OF THE DRAWINGS

FIG. 5 is an illustration showing an example module that identifies an error based on student input;

FIG. 6 is a process flow diagram showing a method for development of an instructional module by the learning experience assembly framework of FIGS. 1A and 1B, FIG. 7 is a process flow diagram showing a method for administering an instructional module by the learning experience assembly framework of FIGS. 1A and 1B.

Corresponding reference characters indicate corresponding elements among the view of the drawings. The headings used in the figures do not limit the scope of the claims.

DETAILED DESCRIPTION

The present disclosure describes a Learning Experience Assembly Framework (LEAF) within the context of a "parent" application that allows educators to create adaptive learning pathways by assembling learning content with integrated programmatic logic, with the goal of providing learners with agency and increased achievement.

Figure 1A:
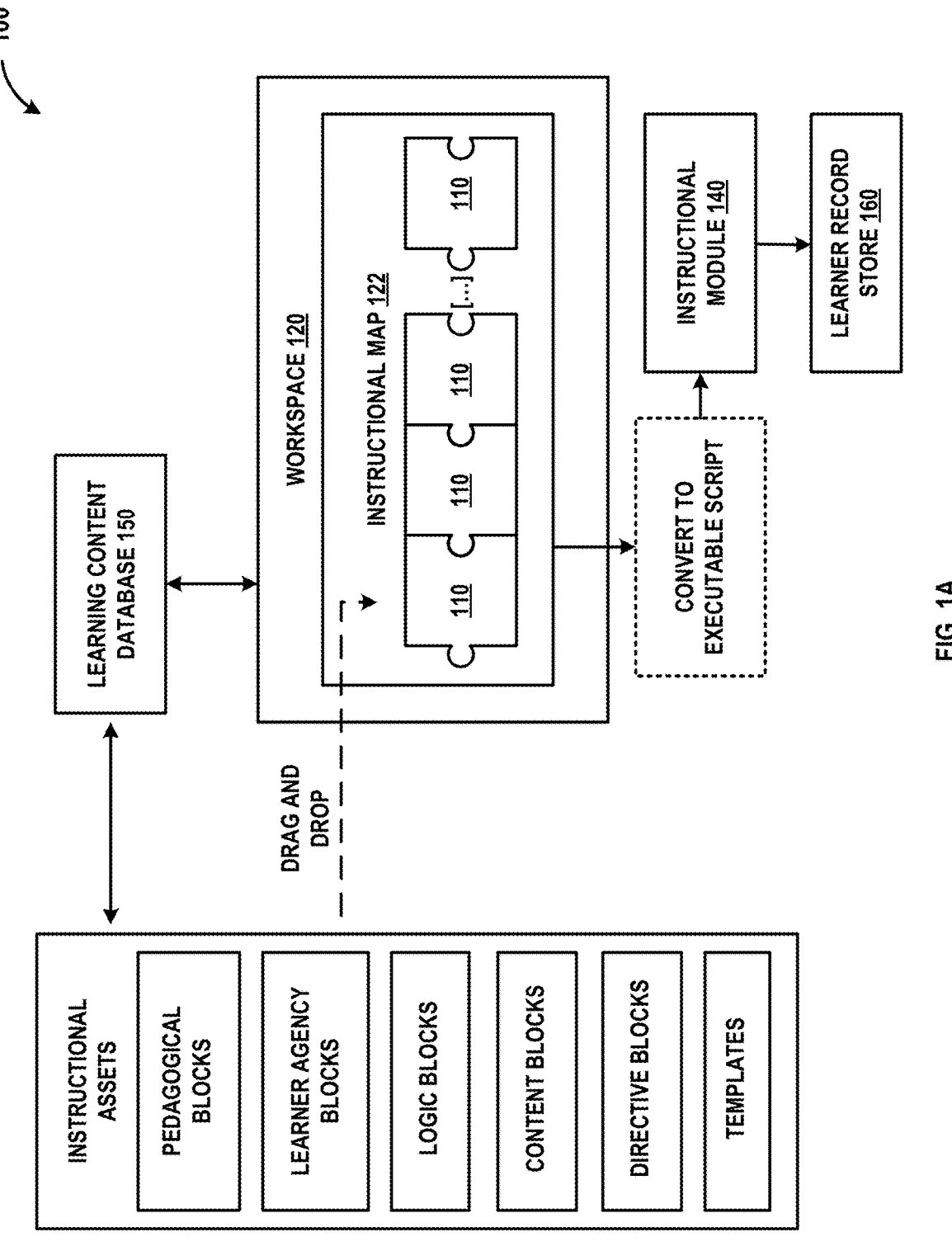
FIGS. 1A and 1B are a pair of simplified diagram showing a learning experience assembly framework for creating an instructional module.
Figure 1B:
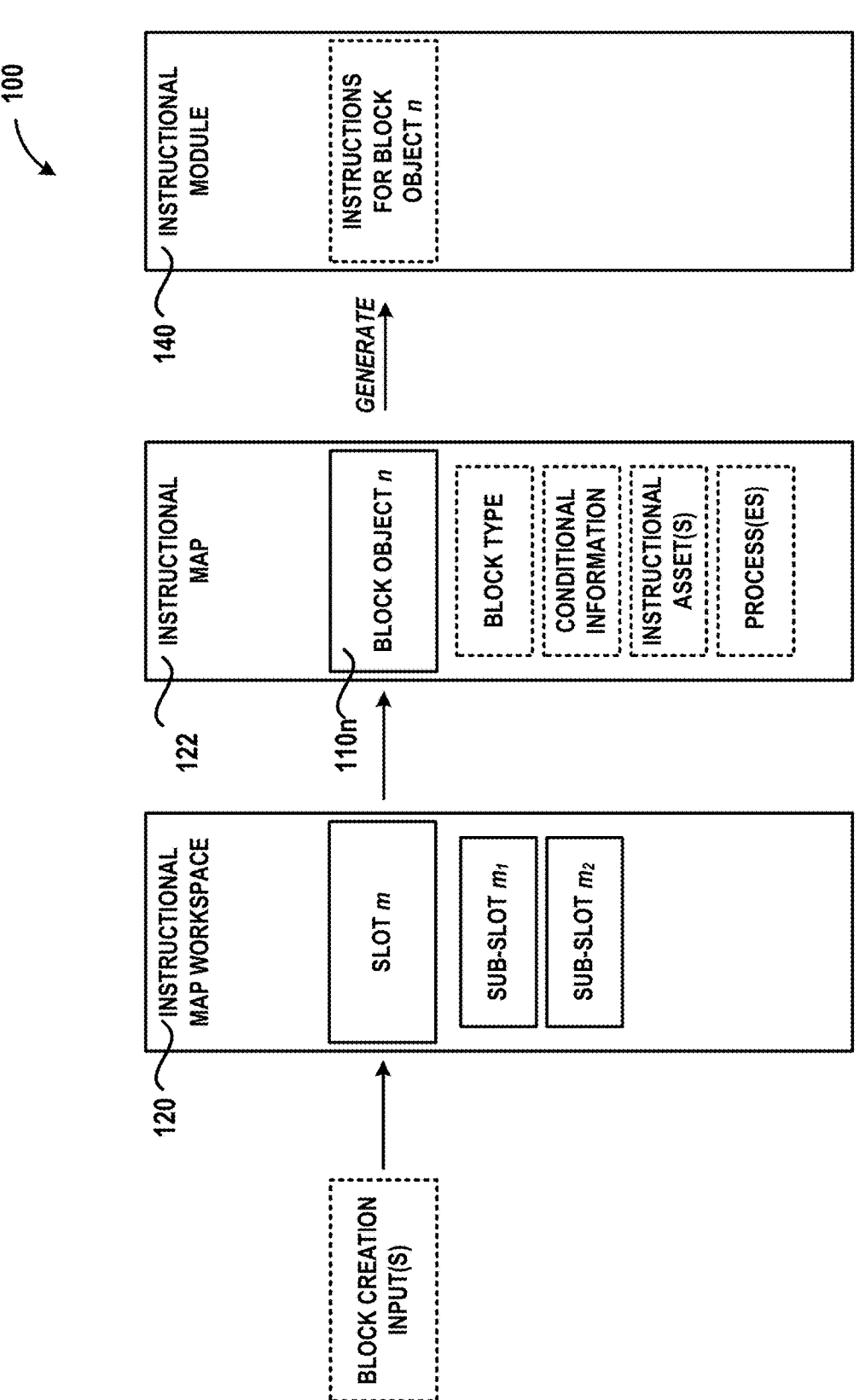

Referring to FIGS. 1A and 1B, a Learning Experience Assembly Framework 100 (hereinafter "framework") provides a scaffolding to build pedagogically-sound adaptive learning experiences by assembling content with integrated logic in a building-block like environment. The framework 100 allows adaptive learning mechanisms to be easily integrated into Instructional Design. Instructional design will also be scaffolded as the blocks will fit in only certain ways based on their interlocking design. Different theoretical perspectives on learning and instructional design can also be incorporated into the framework 100 by building sets of custom blocks aligned with ground theory.

This framework 100 allows educators to use content from a learning content database and assemble it into adaptive learning pathways/experiences, using an intuitive, visual drag-and-drop approach combined with the creation of rules to drive adaptivity—no programming/coding skills needed. The framework 100 also persists the prior state of learning via granular learning performance and learner-content interaction events that drive branching and content presentation rules providing a rich context for personalization and adaptivity. Further, the framework 100 hosts or otherwise manages lesson modules as demonstrated herein.

The visual, drag-and-drop nature of the framework 100 provides a simplified way for creators to build learning pathways using logic blocks that would otherwise have to be coded by software developers. The building block-like architecture scaffolds the scope and sequencing of the learning experience and lowers the bar to building theoretically grounded content. These logic blocks will be used to define the requirements that must be met before a learner can move on to the next step in their learning path. Alternative pathways will similarly be mapped out using this logic, thereby providing an adaptive learning experience. Most existing adaptive platforms do not provide a sufficiently abstracted way to allow educators to do that. This solution empowers educators to do this on their own.

FIGS. 1A and 1B show an overview of the framework 100 disclosed herein. As shown, the framework 100 can provide an instructional map workspace 120 in communication with a learning content database 150 that can be displayed to a first user (e.g., an instructor) for constructing an instructional map 122 for an interactive instructional module 140, such as for an online or semi-online course. The framework 100 enables an instructor to generate their own interactive instructional modules without requiring programming experience.

The instructional map 122 can be used to construct an instructional module 140 that can be displayed to a second user (e.g., a student). The instructional map workspace 120 can visually represent a workspace and can include slots for receipt of a plurality block objects 110 that generally represent discrete components of the instructional map 122. Each respective block object 110 of the plurality of block objects 110 can be custom-created based on one or more block creation input(s) received from the first user in association with the instructional map workspace 120 and are converted into computer-readable instructions for administering the interactive instructional module 140 based on the instructional map 122. Each block object 110 can include information such as:

A block type that dictates certain attributes about the block object 110. Block types can dictate what, if any, additional block objects can be connected to the block object 110 and can also dictate display attributes of the block object 110 when represented within the instructional map workspace (e.g., using a distinct color and shape) as well as types of information that can be associated with the block object 110, such as generating sub-slots, drop-down menus, etc., based on the block type.

Instructional assets that include information and educational content to be presented, such as a quiz, an assignment, an image, a lecture video or other media file, etc. Some block objects 110 may not necessarily display an instructional asset, but may still rely on an outcome of an instructional asset (e.g., logic blocks that determine a "next action" based on if a student passes or fails a quiz).

One or more processes associated with the particular step or component of the instructional map 122—(e.g., displaying one or more instructional assets at a computing device of the second user, displaying a directive to the second user, receiving input from the second user, etc.).

Conditional information—this can generally include information that dictates when and how the block object 110 can be executed, such as a sequential order for execution of the block object relative to another block object which can be indicated, for example, by the slot of the instructional map workspace 120 occupied by the block object. Conditional information can also include more specific conditions that must be met prior to execution of one or more processes associated with the block object 110, such as requiring that the second user passes or fails a quiz administered at a previous block object 110 before interacting with an instructional asset associated with the block object 110, or requiring that the second user watch a video indicated at a previous block object 110 before interacting with an instructional asset associated with the block object 110.

Each block object 110 may be generated and placed at a corresponding location or slot of the instructional map workspace 120 through a drag-and-drop interface or another suitable method and may prompt the first user to customize one or more block objects 110 as needed (e.g., through drop-down menus and/or browser menus to select and/or upload educational content, input fields for entering titles and directives, etc.). Each block object 110 can define a shape indicating options for connected block objects 110— in the examples shown, block objects 110 can be shaped like interlocking puzzle pieces such that certain block objects 110 can only be connected with certain other block objects 110 in a pre-determined order or sequence.

Following generation and placement of the block objects 110 of the instructional map 122, information representing the block objects 110 can be stored at a database (e.g., the learning content database 150) and used to generate computer-readable instructions for administration of the instructional module 140 based on the instructional map 122. For example, an instructional map 122 may include a plurality of block objects 110 that dictate a sequence of actions including:

1. Display a video to a student
2. Administer a quiz to the student
3. If the student fails the quiz, do:
   3.1 Inform the instructor
   3.2 Prompt the student to watch the video again (return to step 1)
4. If the student passes the quiz, do:
   4.1 Update a score for the student in a gradebook
5. Display a lecture to the student In this manner, an instructor who may not have programming experience can create an instructional map (e.g., instructional map 122) and resultant instructional module (e.g., instructional module 140) that executes steps 1-5, with built-in actions conditioned on how the student performs on the quiz (e.g., skipping step 3 entirely if the student passes the quiz on the first try, etc.). Following creation of the instructional map 122, the framework 100 generates, at the processor, computer-readable instructions for administration of the instructional module 140 based on the instructional map 122. This process can involve generating, for each respective block object 110, computer-readable instructions for executing one or more processes associated with an instructional asset of the block object 110, where the computer-readable instructions configure a computing device of the second user (e.g., the student) to execute the operations outlined in the instructional map by the first user. In one example, where a given block object 110 is a "H5P" block, the framework 100 generates JavaScript code for executing one or more processes associated with an instructional asset (e.g., a quiz module, a video, a web page, etc.) of the block object 110.

As shown in FIG. 1B, block creation input(s) are received at an input device of the first user (e.g., an instructor) in association with a slot m of the instructional map workspace 120 to create a new block object n 110*n* of the instructional map 122. The block creation input(s) can provide information about block object n 110*n* including a block type, conditional information, instructional asset(s), and one or more processes associated with block object n 110*n*, including one or more processes associated with the instructional asset(s). Block object n 110*n* may be one of a plurality of block objects 110 that are connected together to form the instructional map 122. Following construction of the instructional map 122, the framework 100 generates computer-readable instructions for administration of the instructional module 140 based on the instructional map 122, which can include, for each block object 110 including block object n 110*n*, computer-readable instructions for executing one or more processes associated with an instructional asset of the block object 110.

Following generation of computer-readable instructions for administration of the instructional module 140, the computer-readable instructions can be communicated to a device of the second user (e.g., a student) to configure the device of the second user to administer the instructional module 140 to the second user based on the instructional map 122, including configuring the device to execute one or more processes associated with the plurality of block objects 110 of the instructional map 122 such as displaying instructional assets and receiving user input responsive to instructional directives.

Figure 2A:
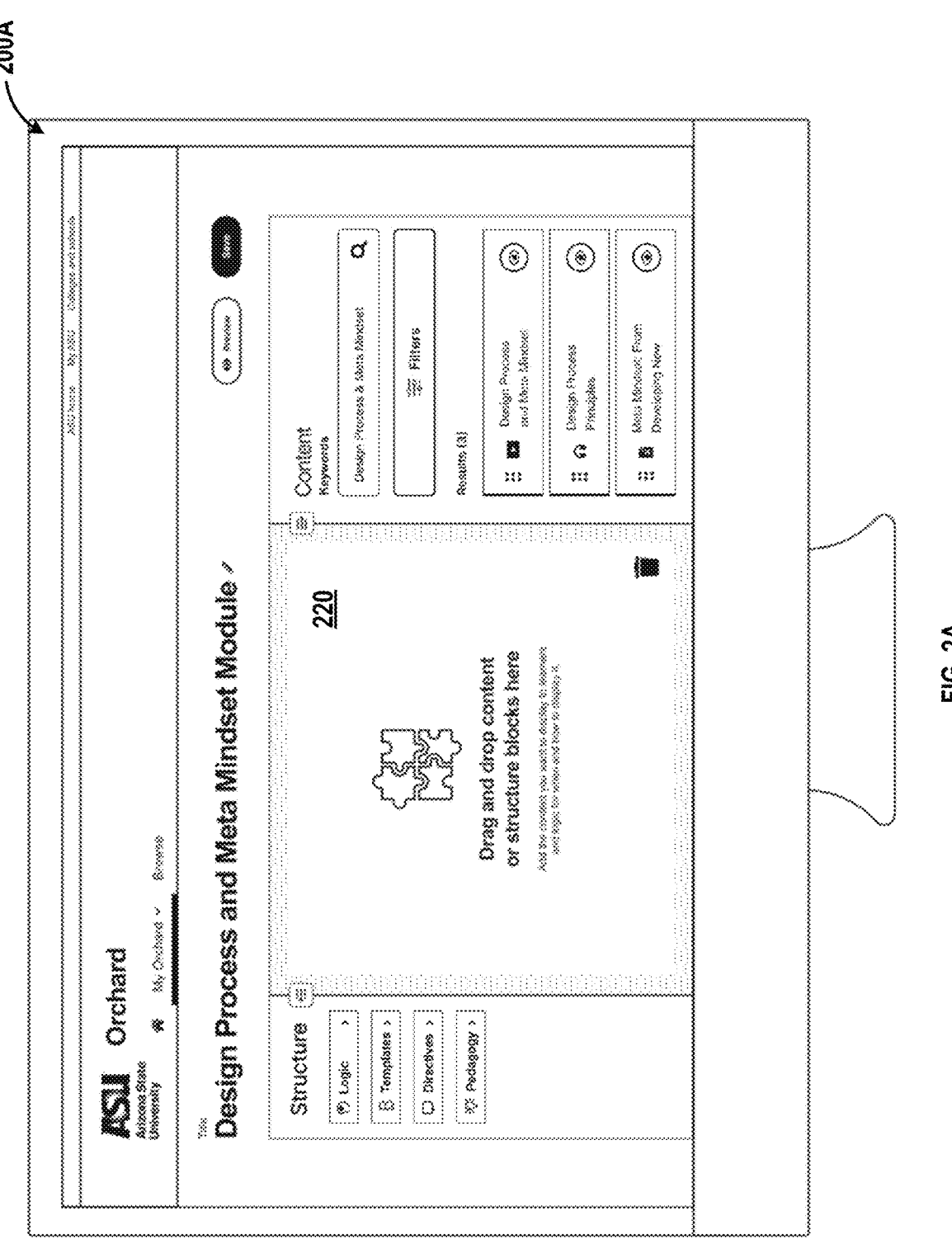
FIGS. 2A-2F are a series of illustrations showing progression of a user interface of the learning experience assembly framework of FIGS. 1A and 1B.
Figure 2B:
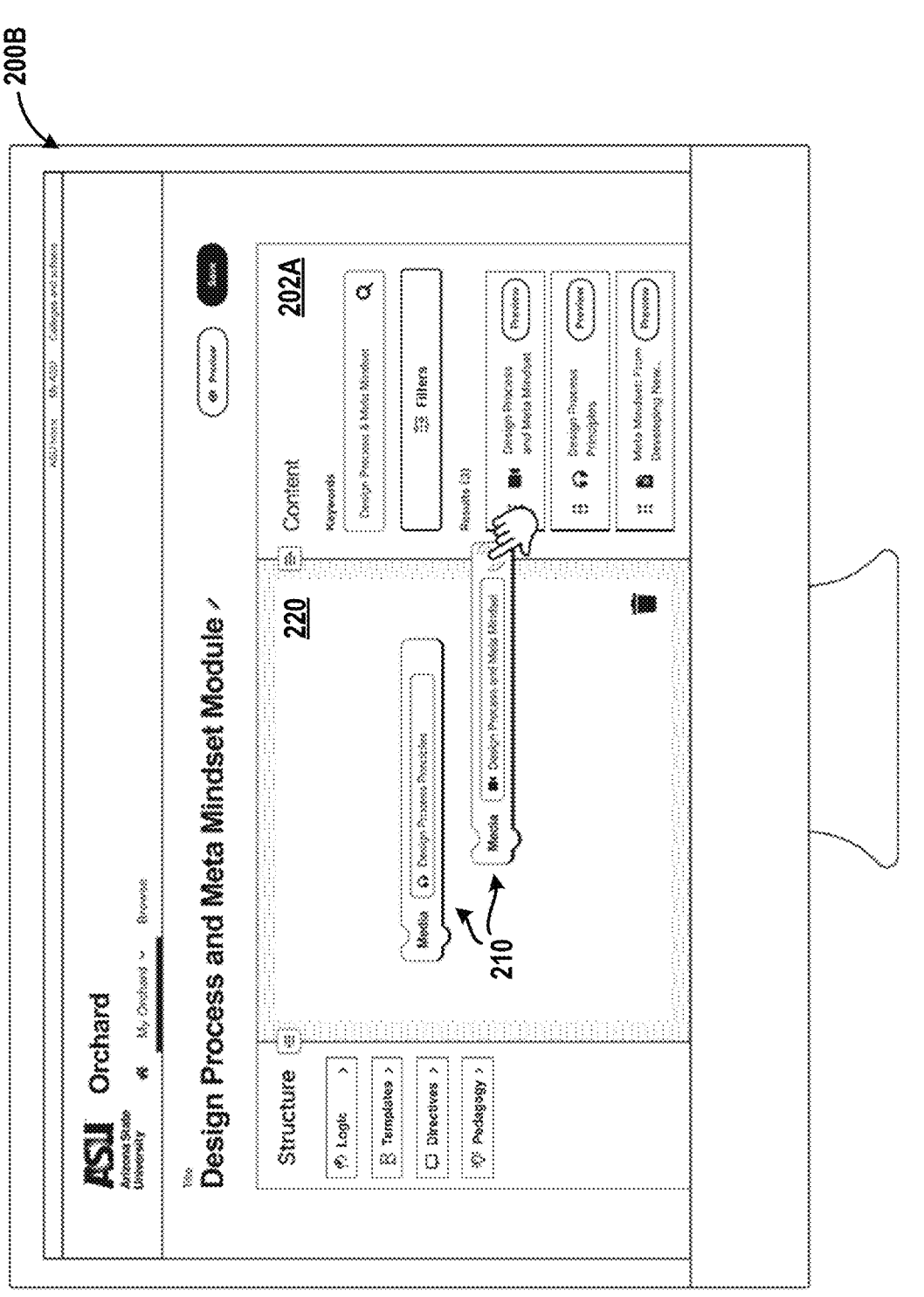

On the left of an example user interface shown in FIGS. 2A and 2B, and in continued reference to the simplified diagram of FIGS. 1A and 1B, the framework 100 provides various different "block" types that the first user (e.g., the instructor) can add to the instructional map 122. The first user can expand any of the selections and drag-and-drop block objects 110 from the left-hand side into the instructional map workspace 120 and connect them as needed. When successfully connected, a satisfying "click" sound may be produced. As discussed, block objects 110 can be configured with different conditions, and/or different content to display to the learner to help guide them. Types of block objects 110 can include, but are not limited to:

Pedagogical blocks—these provide scaffolding to help the educator/instructional designer structure the learning experience and may provide media and other examples of instructional assets for interaction. In one aspect, pedagogical blocks are aligned with instructional design theory. For example, pedagogical blocks aligned with Merrill's Principles of Instruction can be labeled: (1) Activation, (2) Demonstration, (3) Application, (4) Integration. These pedagogical blocks can be characterized as labels that function as containers. The "Activation" block can include a learning experience such as a video that will "activate existing knowledge." The "Demonstration" block can provide learning materials that "demonstrate new knowledge to the learner." In one example, block interlocking mechanisms (that function similar to jigsaw puzzle pieces) will allow only a demonstration block to follow an activation block in the learning sequence, thus scaffolding the application of Merrill's instructional design theory.

Content blocks—these facilitate delivery of instructional assets (e.g., media such as videos and images, presentation and lecture slides, webpages, quiz and assignment submodules, etc.) to a viewer. In some embodiments, content blocks can be included as pedagogical blocks, and/or can be generated by searching for an instructional asset (e.g., stored at the learning content database 150) and dragging-and-dropping the instructional asset into the instructional map workspace 120. In some examples, content blocks can be formulated as "H5P" blocks (e.g., formulated using HTML5 Package) for presenting interactive content to a viewer such as presentation slides and administering quizzes and assignments (e.g., by providing input fields for receipt of student responses). Content blocks can also be "media" blocks that embed videos, images, audio files, and other media content for viewing.

Logic blocks—Logic blocks are blocks the educator can use to create conditions that adapt the learning sequence to the learner, e.g. 'If the quiz is passed, then the learner can move forward.' The purpose of the logic blocks is to provide logic that is typically created by developers in a simplified format that educators can create themselves. Logic blocks can include logic blocks that, for example, indicate a condition for execution of one or more processes of another block object based on user input received in association with an instructional asset.

Figure 3:
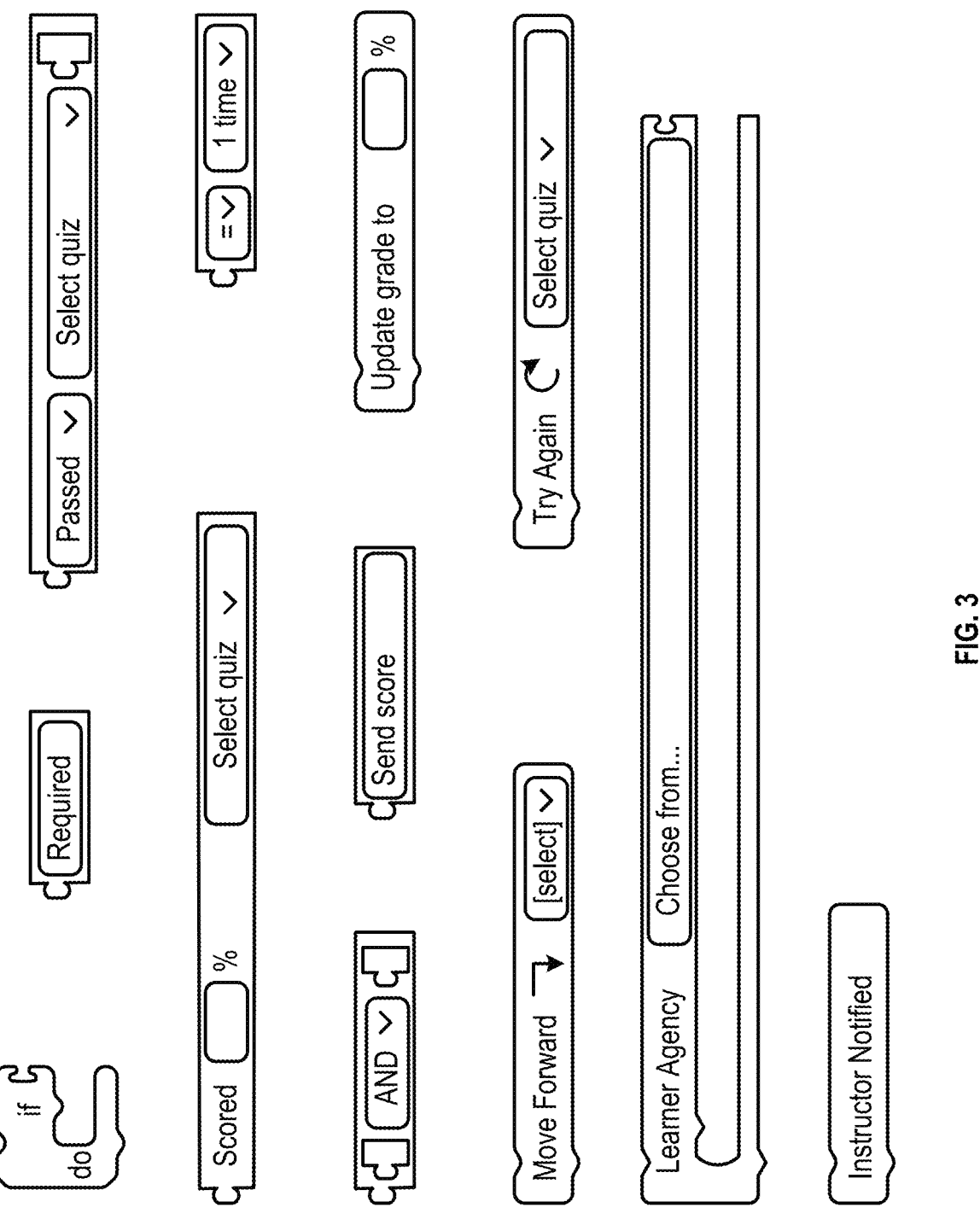
FIG. 3 illustrates various logic blocks of the learning experience assembly framework of FIGS. 1A and 1B, FIGS. 4A and 4B are a pair of simplified diagrams showing an instructional map generated by the learning experience assembly framework of FIGS. 1A and 1B.

FIG. 3 shows various logic blocks that can be implemented, including:
   a. an "if" block
   b. a "required" block
   c. a conditional "pass/fail" block
   d. a conditional "score" block
   e. a "quantity" block
   f. an "and/or" block
   g. various "action" blocks including:
      i. a "send" block
      ii. an "update" block
      iii. a "move forward" block
      iv. a "try again" block
      v. a "learner agency" choice block
      vi. an "instructor notified" block These logic blocks can be used to construct instructional maps and resultant learning modules that adjust lessons based on how the student is doing. For example, an instructional map may require a student to view additional learning materials upon failure of an assignment or quiz, and alternatively may allow a student to skip lectures or learning materials if they pass the assignment or quiz. In another example, an instructional map may require a student to review learning modules from a previous grade level or prerequisite course if they fail one or more critical assignments or quizzes too many times. Further, an instructional map may have conditions built in that examine an answer provided by a student and provide "hints" or additional learning materials based on the student answer.

Learner agency blocks—Learner agency blocks are blocks that the educator can use, in combination with logic blocks, to provide the learner with agency in their learning experience, e.g. 'If the quiz is failed, recommend this video or this article.' In this example, the video and article might provide the same learning outcome, but by placing the two assets in a learner agency block, the educator is giving the learner the opportunity to choose their preferred method of consumption.

Directive blocks—As instructional maps started being created with logic and reusable content, it was found that sometimes the learner needed an explanation of why they were asked to take a test again, or why they were seeing something different. As such, "directive" blocks can display information to students that can supplement the information presented within the pedagogical blocks to guide the student through the instructional module, such as for providing explainable feedback and/or to provide a transition from one learning asset or topic to another.

Templates—Template blocks can include prebuilt learning experiences saved as templates, meaning that for common sequences, just the pedagogical and logic blocks are saved, without the learning assets. The templates can then be reused by adding different learning assets into them, saving time for users not having to recreate the logic each time.

In some embodiments, with continued reference to FIG. 1A, performance of a student can also be captured during administration of the instructional module 140. In one aspect, the framework 100 can record Granular Experience API (xAPI) events as the second user continues through the instructional module dictated by the instructional map 122. In this example, xAPI events can be encoded as triples (subject, verb object) and saved to a database. Examples of xAPI events include: "Learner A started watching video X", "Learner A paused video X at 1m13s", "Learner A completed watching video x". Each event for a user is captured in a Learner Record Store (LRS) 160. The logic blocks mediate the progression through the instructional module 140 by reading xAPI events captured and recorded at LRS 160 to execute the logic built into the learning experience. The LRS 160 also saves the learners "state" within a learning experience. For example, if a learner quits in the middle of an experience, the framework allows the learner to continue from where they left off because the LRS 160 includes a record of the learner's status. In another example, if the instructional map 122 includes block objects 110 that requires a user to complete a video lecture before proceeding, LRS-captured information can be monitored to ensure that the user completes the video before executing further instructions.

On the right-hand side of FIGS. 2A-2E, the first user (e.g., the instructor) can search a learning content database for different instructional assets and templates that can be imported into the instructional map. These instructional assets can be as simple as an image, video, audio file or document, and/or can be as complicated as a full exam module or an existing pre-built instructional map.

The middle portion of FIGS. 2A-2E show the instructional map workspace where the first user (e.g., the instructional designer) assembles the learning experience using the aforementioned block objects and learning assets into an instructional map that can be translated into instructions executable by a computing device (e.g., a computing device of a student) for implementation and administration of the instructional module. In one implementation, the first user can drag and drop items (e.g., block objects 110) into the instructional map workspace.

FIG. 2A shows an example user interface 200A including the (empty) instructional map workspace 220 prior to placement of block objects. Referring to the user interface 200B shown in FIG. 2B, on the right side 202A, the user can search for instructional assets such as media, quizzes, websites, and other content in the learning content database, using various criteria. The diagram shows a simple search. Once the user finds the instructional asset they want to use, the user can "drag and drop" the result onto the instructional map workspace 220, resulting in generation and placement of a block object 210 that includes the instructional asset for display. The first user can select a slot or location for placement of the block object 210 and connect the block object 210 to another block object 210. Same as for pedagogical blocks and logic blocks, when successfully connected, a satisfying "click" sound may be produced to indicate successful placement.

Figure 2C:
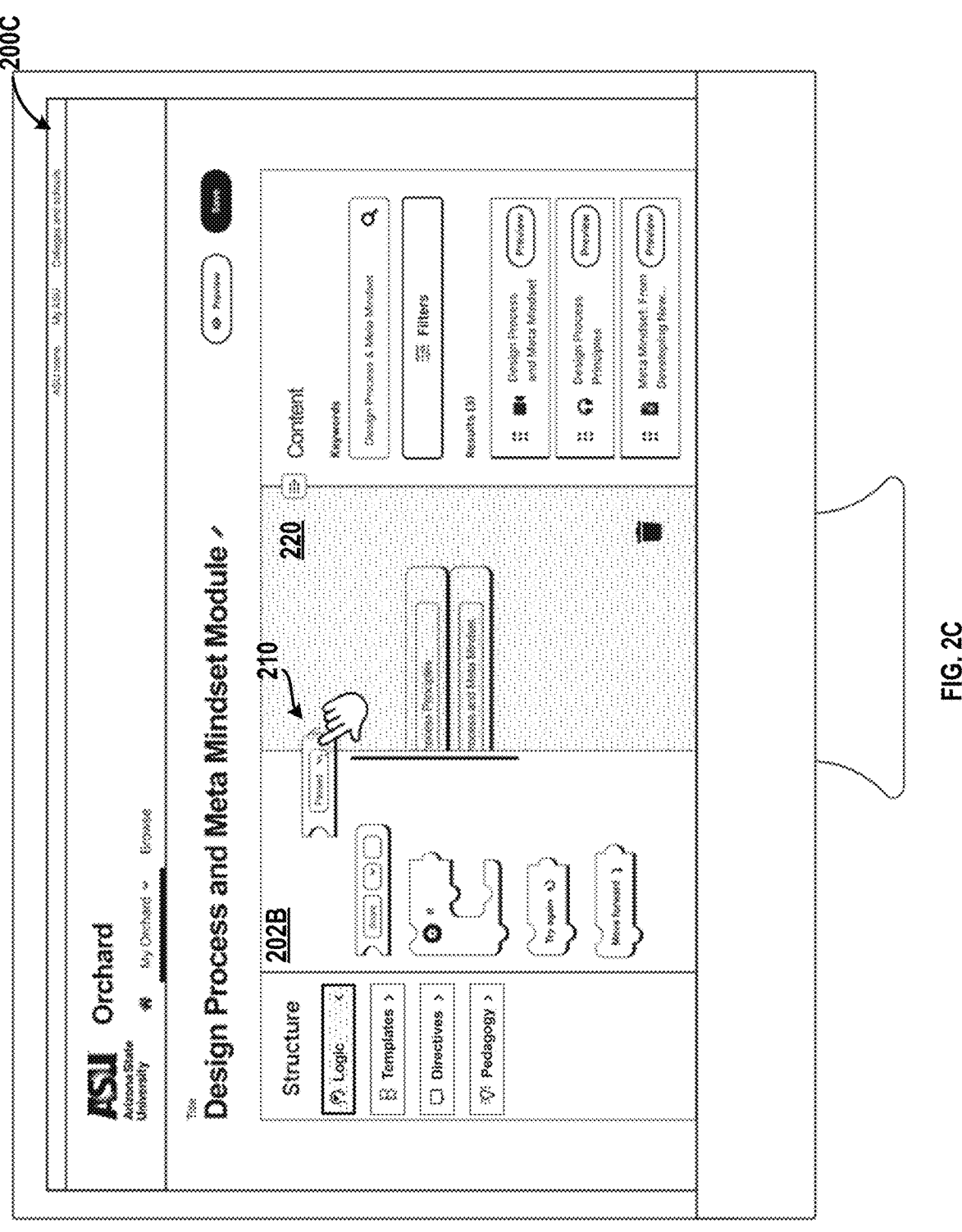
Figure 2D:
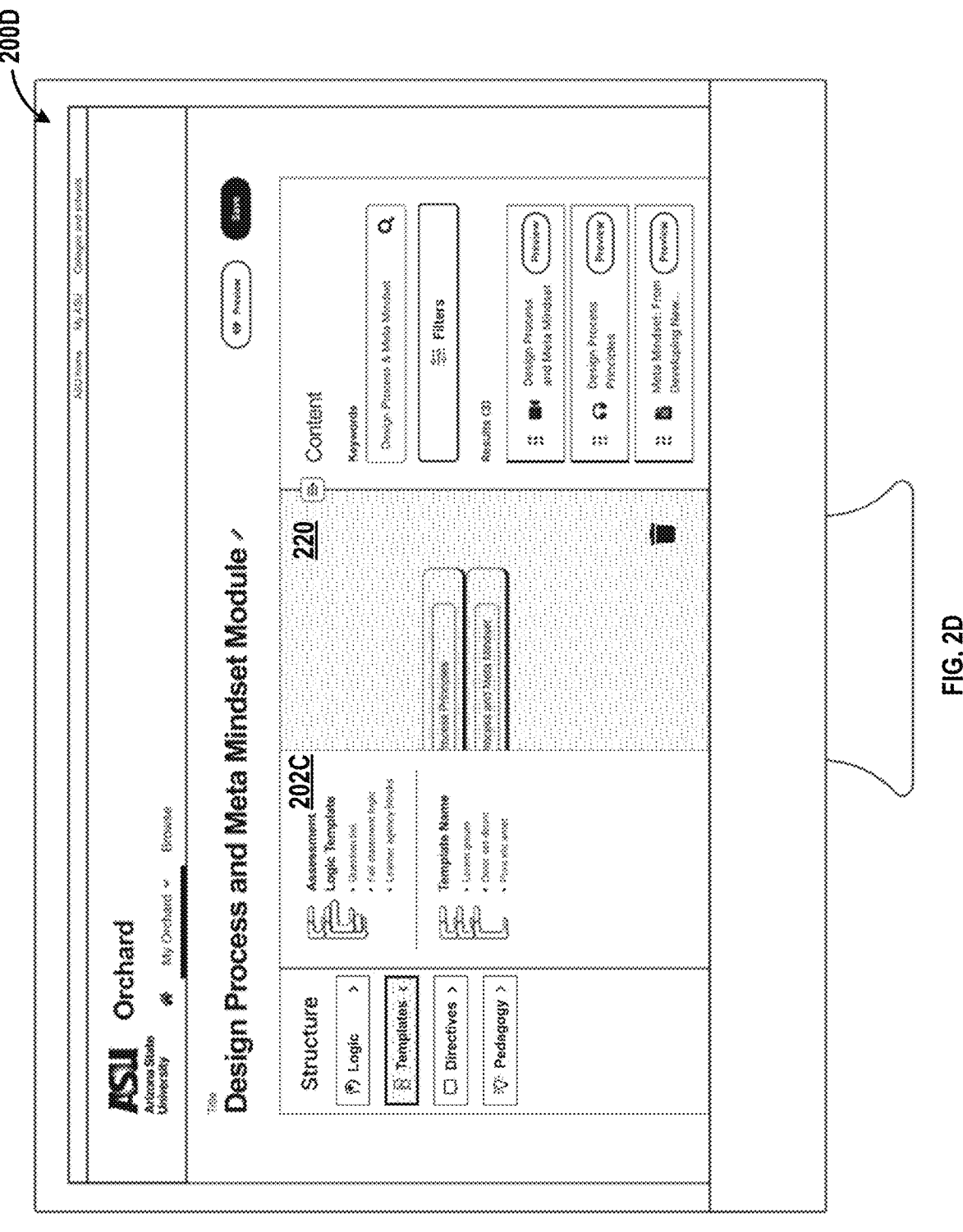

FIG. 2C shows the user interface 200C after the user has interacted with a drop-down menu along a left side 202B of the instructional map workspace 220 to view and select various logical block options for generation and subsequent placement of block objects 210 within the instructional map workspace 220. FIG. 2D similarly shows the user interface 200D with the user interacting with a template block menu 202C that shows various templates that can be used to generate a predetermined set of block objects within the instructional map workspace 220 according to a pre-determined template. In one aspect, template blocks and template instructional maps may be stored at a database for retrieval at the instructional map workspace 120 as shown.

The assembled learning experiences can be simple, or complex. After an instructional map is assembled, the instructional map can be saved as a new asset in the learning asset database and will be available in the "Content" area. The instructional map can then be used as an instructional asset in a new learning experience. Increasingly larger and more complex learning experiences can be assembled in this embedded approach.

Figure 2E:
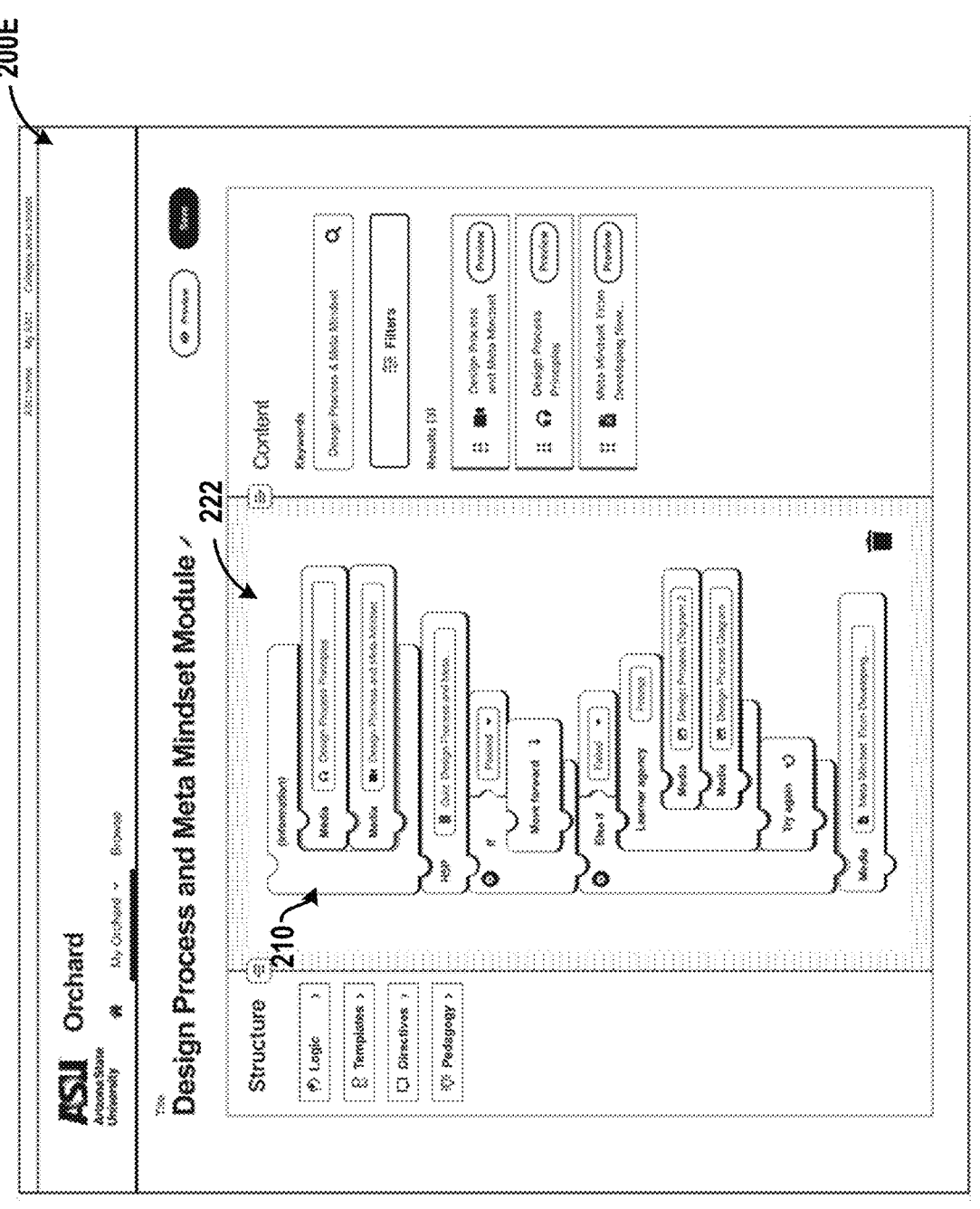
Figure 2F:
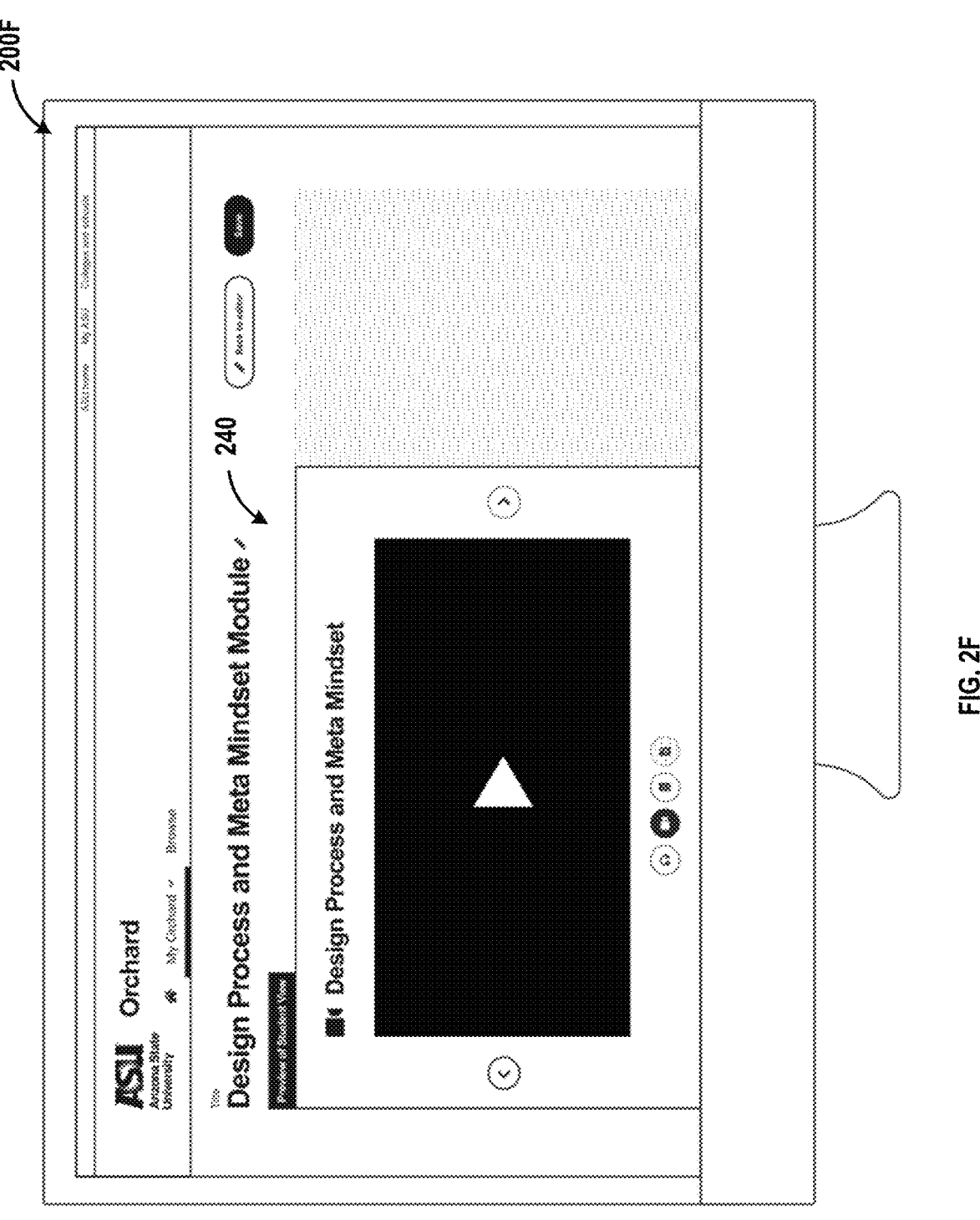

FIG. 2E shows a user interface 200E with an assembled instructional map 222 (e.g., from the perspective of the instructor), and FIG. 2F shows a user interface 200F displaying a first "page" of a resultant instructional module 240 constructed based on the instructional map 222 (e.g., from the perspective of the student) following generation of computer-readable instructions for administration of the instructional module 240. Learners can consume built learning experiences from external learning clients such as Learning Management Systems (LMSs). In the case of an LMS, integration can be enabled based on the Learning Tools Interoperability (LTI) framework. Embedded learning content within the assembled instructional module is presented to the learner according to the conditions and sequence outlined by the instructional map from beginning to end, mediated by the programmatic logic and learner agency blocks. As a result, the experience of the learner is very focused.

Figure 4A:
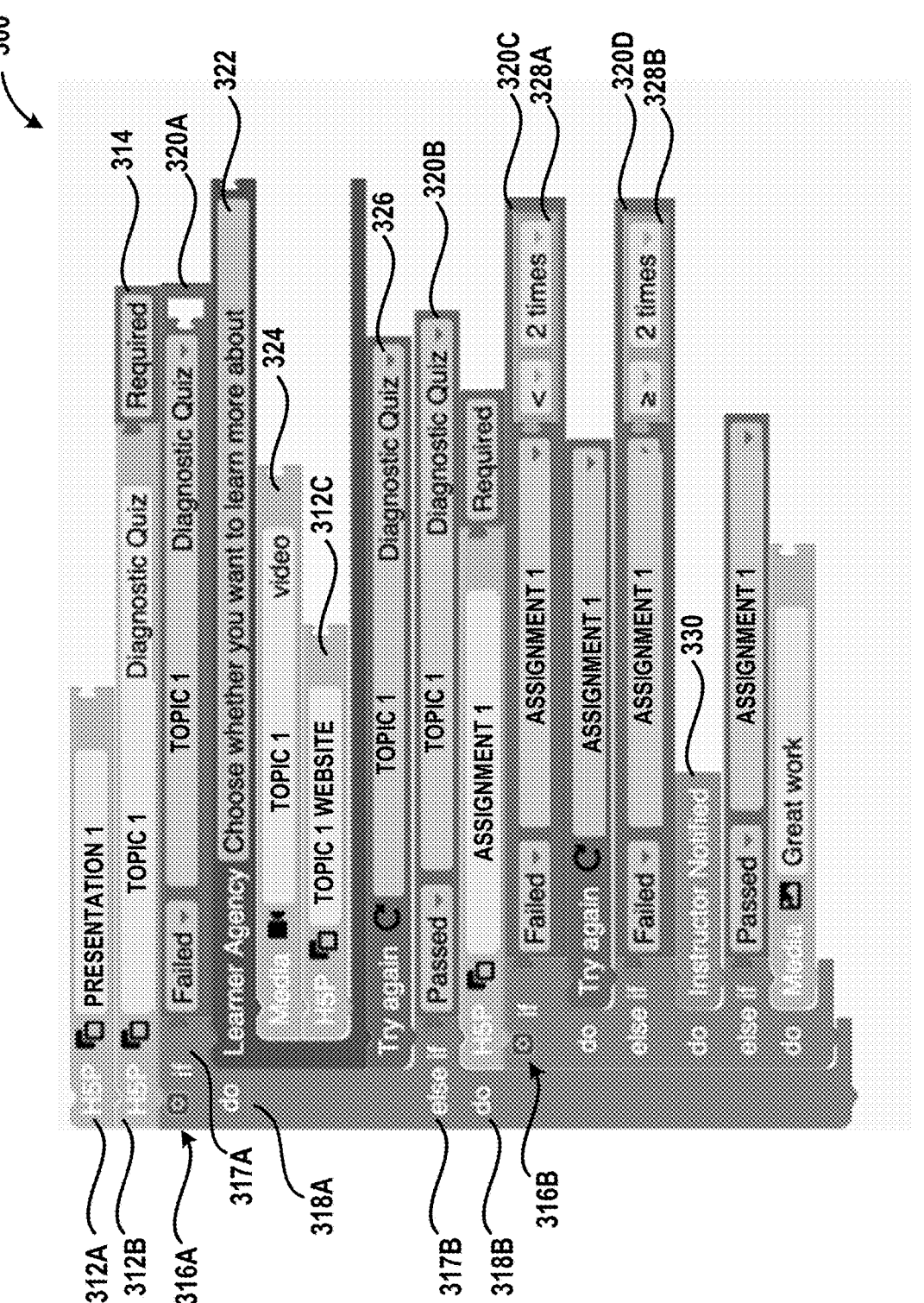
Figure 4B:
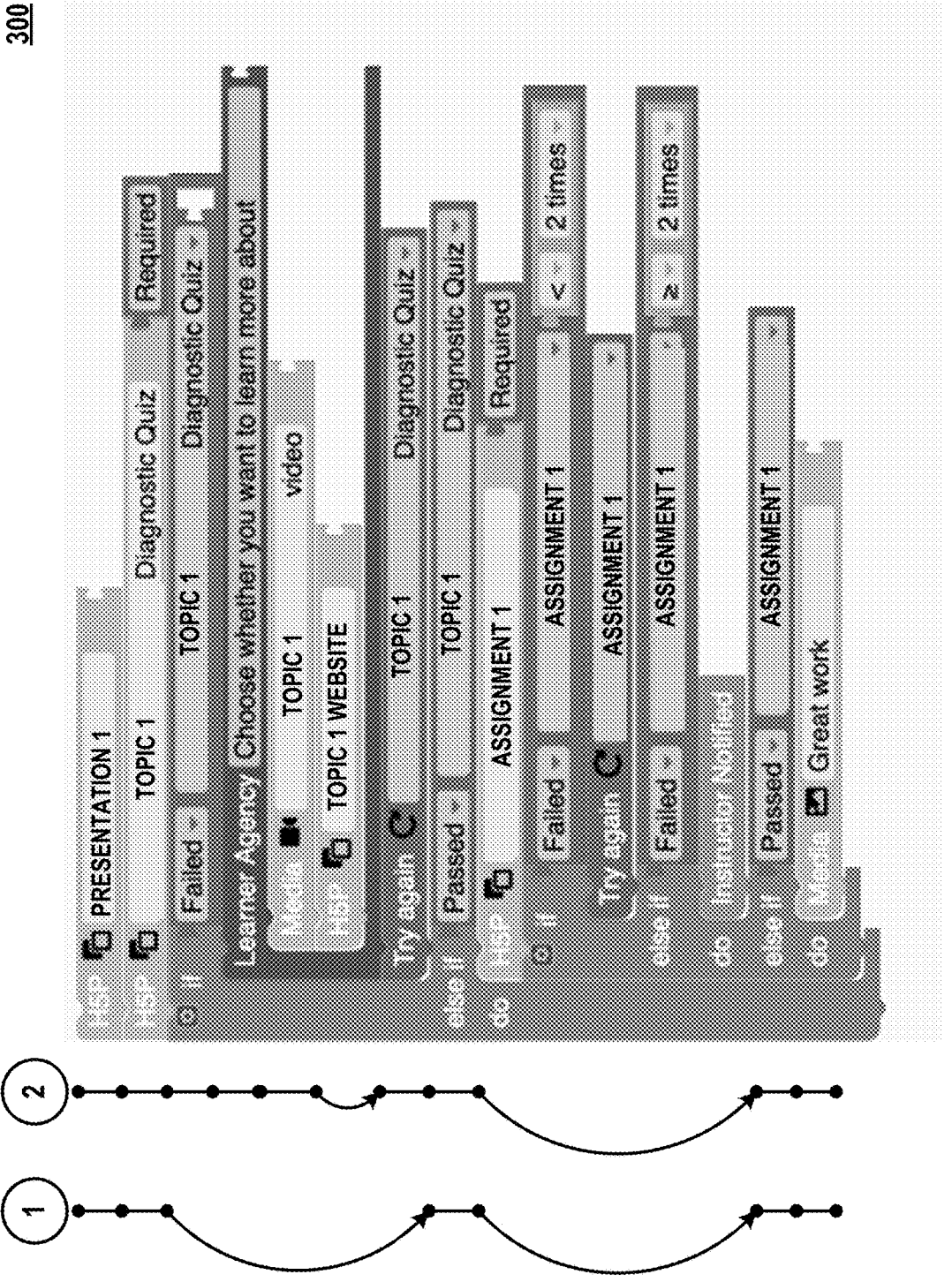

A walkthrough example is shown with respect to an instructional map 300 shown in FIGS. 4A and 4B. A first user provides a block creation input that includes information indicative of a block object of the instructional map for placement at a slot of a plurality of slots or a location of an instructional map workspace—in this example, the block objects can include a first content block object 312A that includes a presentation followed by a second content block object 312B that includes directives and input fields for a quiz (with a "required" logic block object 314 attached to indicating it is non-skippable). As such, the system generates these block objects (e.g., first content block object 312A and second content block object 312B) having block types based on their associated block creation inputs and displays the block object within the instructional map workspace based on the block type.

In some examples, the block objects are displayed within the instructional map workspace using a distinct color and shape based on the block type. The shape of the block object can indicate allowable connections with another block object (e.g., using a "puzzle piece" interconnecting configuration as shown in the examples). Further, the block objects can as displayed can include as one or more sub-slots, drop-down menus, etc., based on the block type, conditional information, instructional assets, and processes associated with each respective block object. Conditional information can be attributed to a block object in various ways, such as sequential order (presentation sequence, which can be enforced based on slots of the workspace occupied by each respective block object) or conditions that must be met to proceed (such as inclusion of additional logic block objects, for example, a "required" block indicating that a student must complete the diagnostic quiz in order to continue).

For the first content block object 312A, an associated instructional asset can include a presentation or lecture, and the one or more processes associated with the instructional asset includes displaying the instructional asset at a display device of a user—these can be configured by the first user upon creation of the first content block object 312A. For the second content block object 312B associated instructional assets can include images, text, or other content associated with the diagnostic quiz for Topic 1, and one or more processes associated with the instructional assets can include: displaying an instructional directive associated with the instructional asset to a user (e.g., quiz questions); receiving, at an input field, user input responsive to the instructional directive (e.g., answers to quiz questions); progressing to another block of the instructional map based on the user input received at the input field (e.g., moving on to the next block upon completion); and storing the user input at a database in association with the instructional module—similarly, these can be configured by the first user upon creation of the second content block object 312B.

As shown, the first user provides a block creation input that includes information indicative of a first "if-then" logic block object 316A of the instructional map 300 that has several arguments and conditions for proceeding. For this example, the first "if-then" logic block object 316A indicates that if a student fails the diagnostic quiz for Topic 1 then they are presented with options within the "learner agency" block. First, the system generates the first "if-then" logic block object 316A based on the block creation input and displays the first "if-then" logic block object 316A within the instructional map workspace, including: a first "if"

sub-slot 317A (e.g., for a first argument that provides the "answer" to "if") for receipt of a logic block object (for this example, "Failed Quiz 1" logic block object 320A representing "if [the student] fails the quiz for Topic 1") in association with the if-then block object and a first "do" sub-slot 318A (e.g., for a second argument that provides the "answer" to "do") for receipt of an additional block object (for this example, "learner agency" block object 322 representing "have the student select media to watch for Topic 1") in association with the if-then block object, where instructions for execution of the additional block object are conditioned based on the logic block of the first sub-slot.

As such, the processor receives a first block creation input that includes information indicative of the logic block object (e.g., "Failed Quiz 1" logic block object 320A) of the instructional map to be placed at the "if" sub-slot of the if-then block object, the logic block object indicating a condition for execution of one or more processes of the additional block object based on user input received in association with an instructional asset. The processor also receives a second block creation input that includes information indicative of the additional block object (e.g., "learner agency" block object 322 and additional blocks encompassed therein) of the instructional map to be placed at the second sub-slot of the if-then block object, and generates computer-readable instructions for execution of one or more processes of the additional block object, the one or more processes of the additional block object to be executed upon completion of the instructional asset associated with the logic block object according to the condition.

The "learner agency" block object 322 can include two or more sub-slots that the student can select from—in the example, the "learner agency" block object 322 includes a first "media" block object 324 and a third content object 312C; the student can select one or both of them to interact with. Following completion of the "learner agency" block object 322, a "try again" block object 326 is presented within the first "do" sub-slot 318A of the first "if-then" logic block object 316A at which the student can try re-taking the diagnostic quiz for Topic 1—at this point the student would be "routed" back up to the second content block object 312B that includes directives and input fields for the diagnostic quiz for Topic 1.

The first "if-then" logic block object 316A can also include a second "if" sub-slot 317B (e.g., an "else if" slot) and a subsequent second "do" sub-slot 318B that represents a path to be taken if the condition at the second "if" sub-slot 317B is met—e.g., if the student passes the diagnostic quiz for Topic 1. The second "if" sub-slot 317B can receive a "Passed Quiz 1" logic block object 320B and the second "do" sub-slot 318B can receive one or more additional blocks. In this example, the second "do" sub-slot 318B can receive another content block object for administrating an assignment (e.g., Assignment 1) and a second "if-then" logic block object 316B nested within the second "do" sub-slot 318B as shown, representing instructions to have the student complete Assignment 1 and conditioning subsequent instructions based on whether the student passes or fails Assignment 1. In this example, a first "Failed Assignments 1" logic block object 320C includes a sub-slot for a first conditional quantifier block object 328A that conditions subsequent instructions (e.g., having the student try Assignment 1 again) based on how many times the student has failed—if the student fails Assignment 1 once, then this "fork" is taken. A second "Failed Assignments 1" logic block object 320D includes a sub-slot for a second conditional quantifier block object 328B that conditions subsequent instructions (e.g., notifying the instructor as indicated by an "instructor notified" logic block 330) based on how many times the student has failed—if the student fails Assignment 1 more than once, then this "fork" is taken and the instructor is automatically notified. Finally, the instructional map 300 indicates that if the student passes Assignment 1, then they are shown a "Great Work" message and reach the end of the instructional map 300 as indicated by a final media block object.

Upon creation of the instructional map 300, the system (e.g., a device implementing framework 100) generates computer-readable instructions for administration of the instructional module based on the instructional map. In this example shown in FIG. 4B, a first student and a second student are presented with an instructional module constructed from the instructional map 300 of FIG. 4A. At the student device, steps include receiving computer-readable instructions for execution of an instructional module based on an instructional map (e.g., instructional map 300), the instructional map including the block objects discussed above and shown in FIG. 4A. Each respective block object can be used to generate computer-readable instructions for execution of one or more processes at the student device and/or another device in communication with the student device for implementing the framework, including configuring a processor of the student device and/or another device in communication with the student device for implementing the framework to execute the one or more processes associated with the instructional map.

The first student interacts with the instructional assets for the first content block object and the second content block object (which includes the diagnostic quiz for Topic 1) and passes the diagnostic quiz for Topic 1—as such, they are allowed to skip the "learner agency" block and move on to interact with the instructional assets of the "Assignment 1" block object. The first student passes Assignment 1 as well, as a result they are presented with the "good job" media block object. For these block objects encountered by the first student, the one or more processes associated with each instructional asset includes displaying the instructional asset at a display device of a user. When interacting with the diagnostic quiz block object and the assignment object, the one or more processes associated with each instructional asset includes: displaying an instructional directive associated with the instructional asset to a user (e.g., a quiz question); receiving, at an input field, user input responsive to the instructional directive (e.g., answers to the quiz question); and progressing to another block of the instructional map based on the user input received at the input field (e.g., moving on to interact with the assignment after passing the quiz). In some examples, further processes associated with the instructional assets can includes storing the user input at a database in association with the instructional module (e.g., saving or otherwise recording student answers for the quiz and assignment).

The second student interacts with the first presentation and fails the diagnostic quiz, so they are required to select an option from the "learner agency" block. Suppose the second student selects a video represented by the first media block object, watches the video, and attempts the diagnostic quiz for Topic 1 again. The second student passes the diagnostic quiz on the second attempt and is presented with Assignment 1. The second student passes Assignment 1, as a result they are presented with the "good job" media and the system does not need to send a notification to the instructor.

In another aspect, block objects can include other instructional maps. For example, an instructional map may "route"

a student back to a foundational module (e.g., a prerequisite module for concepts) to complete if the student fails too many directives. Following successful completion of the foundational module, a student may be allowed to try again. In another example, a learner agency block object can be constructed that enables a student to select and participate in one or more advanced modules to learn more about a topic.

In some embodiments, the framework 100 can incorporate automated tutor feedback and hint generation. For example, an instructional map can include logic block objects that present tailored lesson materials in response to input received from the student during administration of assignments and quizzes. FIG. 5 shows one example in which a math practice problem is presented to a student. The student executes a step shown in the dotted area indicating an error. The instructional map may indicate that if an answer is received that violates a mathematical property such as the example shown, the learning module may: indicate to the student that an error has been detected, indicate the type of error detected, and provide the student with an option to view learning materials that could help them solve the problem correctly.

Creating an instructional map 122 of the instructional module 140 has a set of prerequisites, which includes setting up the project (e.g., generating an instructional map workspace having a plurality of slots for generation of an instructional map, the instructional map being representative of an instructional module to be administered).

Step 1: Adding Libraries

In one aspect, the framework 100 includes modules and data structures enabling creation of a JavaScript runtime environment.

As an example, default modules included within the framework 100 can include:

Core: The main library, which defines the basic UI and logic.

Built-in block definitions: Common blocks such as loops, logic, math, and string manipulation.

The JavaScript generator: Converts blocks into JavaScript, and contains block generators for all built-in blocks.

Language files: String tables for all messages on built-in blocks and the UI, in English or another suitable language.

Step 2: Create a Workspace

The next step is to add a workspace 120 to the framework 100 and define a toolbox. For example, a workspace can include two main components:

An Editor area where the user assembles their blocks; and a toolbox that includes all blocks that are available to the user.

The toolbox may be used to organize all the available blocks into categories. In one implementation, a toolbox can be defined in XML and passed into the workspace constructor.

Step 3: Create a Custom Block

A next step is to define custom blocks. In creating the instructional map 122 for the instructional module 140, a block object that holds the information (e.g., instructional resources, H5P implementation details) of learning assets is required. A block definition may describe how a block should look and behave. This includes the text, color, and shape of the blocks. It can also include other blocks to which it can connect.

"Drag-n-Drop" Asset blocks to the Workspace editor: HTML can be used to provide a drag and drop feature to drag a Video/Audio/Document/Image/H5P object and drop it into the editor.

Step 4: Save/Load Workspace

Add the save method—In one example, a function workspaceToDom exports the workspace, to an XML DOM structure and stores it in a variable.

Add the load method—When a user visits the instructional map page for the instructional module in the editor mode, the XML DOM structure associated with this instructional map is fetched and loaded into the workspace. This clears the workspace from any blocks and then loads the blocks from the XML, which is stored in the database.

Step 5: Generate JavaScript Code

To convert the instructional map 122 into the instructional module 140, a function (e.g., "workspaceToCode") or another method can be used to generate JavaScript code for each block in the workspace. The browser runs the generated code, effectively executing the blocks that are set up in the workspace.

The language generator—Code can be generated from blocks for different languages, e.g. JavaScript, Python, or PHP. A language generator defines the rules for generating a specific language. For all the custom blocks, a specialized translation function called a block generator is provided.

Step 6: Run the Generated Code

On clicking the preview button, the framework generates the code from that workspace.

Method

Referring to FIG. 6, a simplified method 400 is illustrated that outlines steps for development of an instructional module according to aspects of the present disclosure.

Step 402 of method 400 includes displaying, at a display device in communication with a processor, an instructional map workspace having a plurality of slots for generation of an instructional map, the instructional map being representative of an instructional module to be administered.

Step 404 of method 400 includes receiving, at the processor, a block creation input that includes information indicative of a block object of the instructional map for placement at a slot of the plurality of slots of the instructional map workspace. In some embodiments, the block object includes conditional information indicative of a condition that must be met prior to execution of one or more processes associated with the block object. The conditional information can include a sequential order for execution of the one or more processes associated with the block object relative to another block object (e.g., the sequential order being enforced based on the slot of the plurality of slots of the instructional map workspace, defined by block type (if-then), defined by connected blocks ("required" or "times), etc.). The conditional information can also include a condition on a user response received at an input field of the instructional module for execution of one or more processes associated with the block object. In a further aspect, the block object includes information representative of an instructional asset.

One or more processes associated with the block object can include displaying the instructional asset at a display device of a user. Further, one or more processes associated with the instructional asset can include: displaying an instructional directive associated with the instructional asset to a user; receiving, at an input field, user input responsive to the instructional directive; progressing to another block of the instructional map based on the user input received at the input field; and storing the user input at a database in association with the instructional module.

Step 406 of method 400 includes generating the block object having a block type based on the block creation input. Step 408 of method 400 includes displaying the block object within the instructional map workspace based on the block type. Steps 406 and 408 can encompass displaying the block object within the instructional map workspace using a distinct color and shape based on the block type. For example, the shape of the block object can indicate allowable connection of another block object with the block object. Further, steps 406 and 408 can include generating and displaying sub-slots, drop-down menus, etc., based on the block type.

Step 410 of method 400 includes recording the block object of the instructional map in association with the slot of the instructional map workspace.

Step 412 of method 400 includes generating, at the processor, computer-readable instructions for administration of the instructional module based on the instructional map.

Step 414 of method 400 includes administering, at a computing device of a user, the instructional module based on the instructional map.

Referring to FIG. 7, a simplified method 500 is illustrated that outlines steps for administering an instructional module according to aspects of the present disclosure.

Step 502 of method 500 includes receiving computer-readable instructions for execution of an instructional module based on an instructional map, the instructional map including one or more block objects, each respective block object of the one or more block objects having computer-readable instructions for execution of one or more processes associated with the block object. Step 504 of method 500 includes configuring the processor to administer the instructional module based on the computer-readable instructions for execution of the instructional module. Step 506 of method 500 includes configuring the processor to execute one or more processes associated with the one or more block objects of the instructional map.

Step 508 of method 500 includes displaying the instructional asset at a display device in communication with the processor.

For executing modules that involve receiving student input (e.g., for quizzes or assignments), step 510 of method 500 includes displaying an instructional directive associated with the instructional asset to a user. Step 512 of method 500 includes receiving, at an input field, user input responsive to the instructional directive. Step 514 of method 500 includes progressing to another block of the instructional map based on the user input received at the input field. Step 516 of method 500 includes storing the user input at a database in association with the instructional module.

Computer-Implemented System

Figure 8:
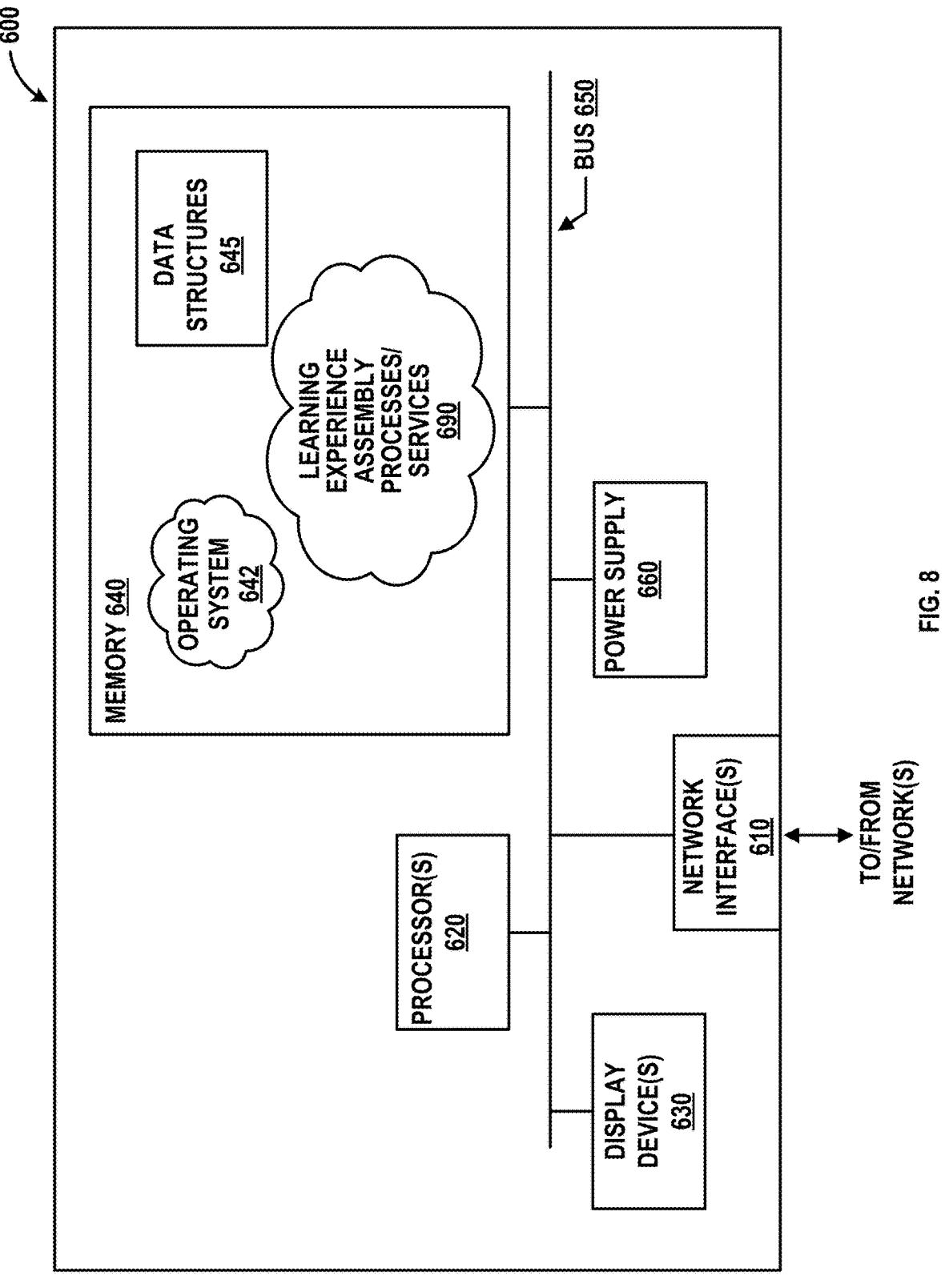
FIG. 8 is a simplified diagram showing an example computing device for implementation of the system of FIGS. 1A and 1B.

FIG. 8 is a schematic block diagram of an example device 600 that may be used with one or more embodiments described herein, e.g., as a component of framework 100 shown in FIGS. 1A and 1B.

Device 600 comprises one or more network interfaces 610 (e.g., wired, wireless, PLC, etc.), at least one processor 620, at least one display device 630, and a memory 640 interconnected by a system bus 650, as well as a power supply 660 (e.g., battery, plug-in, etc.).

Network interface(s) 610 include the mechanical, electrical, and signaling circuitry for communicating data over the communication links coupled to a communication network. Network interfaces 610 are configured to transmit and/or receive data using a variety of different communication protocols. As illustrated, the box representing network interfaces 610 is shown for simplicity, and it is appreciated that such interfaces may represent different types of network connections such as wireless and wired (physical) connections. Network interfaces 610 are shown separately from power supply 660, however it is appreciated that the interfaces that support PLC protocols may communicate through power supply 660 and/or may be an integral component coupled to power supply 660.

Memory 640 includes a plurality of storage locations that are addressable by processor 620 and network interfaces 610 for storing software programs and data structures associated with the embodiments described herein. In some embodiments, device 600 may have limited memory or no memory (e.g., no memory for storage other than for programs/processes operating on the device and associated caches). Memory 640 can include instructions executable by the processor 620 that, when executed by the processor 620, cause the processor 620 to implement aspects of the framework 100 and the methods 400 and/or 500 outlined herein.

Processor 620 comprises hardware elements or logic adapted to execute the software programs (e.g., instructions) and manipulate data structures 645. An operating system 642, portions of which are typically resident in memory 640 and executed by the processor, functionally organizes device 600 by, inter alia, invoking operations in support of software processes and/or services executing on the device. These software processes and/or services may include Learning Experience Assembly processes/services 690, which can include aspects of method 400 and/or implementations of various modules described herein. Note that while Learning Experience Assembly processes/services 690 is illustrated in centralized memory 640, alternative embodiments provide for the process to be operated within the network interfaces 610, such as a component of a MAC layer, and/or as part of a distributed computing network environment.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules or engines configured to operate in accordance with the techniques herein (e.g., according to the functionality of a similar process). In this context, the term module and engine may be interchangeable. In general, the term module or engine refers to model or an organization of interrelated software components/functions. Further, while the Learning Experience Assembly processes/services 690 is shown as a standalone process, those skilled in the art will appreciate that this process may be executed as a routine or module within other processes.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A system, comprising:

a processor in communication with a memory, the memory including instructions executable by the processor to:

display, at a display device in communication with the processor, an instructional map workspace having a plurality of slots for generation of an instructional map, the instructional map being representative of an instructional module to be administered;

receive, at the processor, a block creation input that includes information indicative of a block object of the instructional map for placement at a slot of the plurality of slots of the instructional map workspace, the block object being an if-then block object;

record the block object of the instructional map in association with the slot of the instructional map workspace;

generate, at the processor, computer-readable instructions for administration of the instructional module based on the instructional map;

display a first sub-slot of the slot of the instructional map workspace for receipt of a logic block object in association with the if-then block object; and display a second sub-slot of the slot of the instructional map workspace for receipt of an additional block object in association with the if-then block object, where instructions for execution of the additional block object are conditioned based on the logic block object of the first sub-slot.

2. The system of claim 1, the memory further including instructions executable by the processor to:

administer, at a computing device of a user, the instructional module based on the instructional map.

3. The system of claim 1, wherein the block object includes conditional information indicative of a condition that must be met prior to execution of one or more processes associated with the block object.

4. The system of claim 3, wherein the conditional information includes a sequential order for execution of the one or more processes associated with the block object relative to another block object.

5. The system of claim 3, wherein the conditional information includes a condition on a user response received at an input field of the instructional module for execution of the one or more processes associated with the block object.

6. The system of claim 1, wherein the block object includes information representative of an instructional asset.

7. The system of claim 6, wherein the memory further includes instructions executable by the processor to:

generate, for the block object, computer-readable instructions for executing one or more processes associated with the instructional asset.

8. The system of claim 7, wherein the one or more processes associated with the instructional asset includes displaying the instructional asset at a display device of a user.

9. The system of claim 7, wherein the one or more processes associated with the instructional asset includes:

displaying an instructional directive associated with the instructional asset to a user;

receiving, at an input field, user input responsive to the instructional directive; and progressing to another block of the instructional map based on the user input received at the input field.

10. The system of claim 9, wherein the one or more processes associated with the instructional asset includes:

storing the user input at a database in association with the instructional module.

11. The system of claim 1, the memory further including instructions executable by the processor to:

generate the block object having a block type based on the block creation input; and display the block object within the instructional map workspace based on the block type.

12. The system of claim 1, the memory further including instructions executable by the processor to:

receive, at the processor, a first block creation input that includes information indicative of the logic block object of the instructional map to be placed at the first sub-slot of the if-then block object, the logic block object indicating a condition for execution of one or more processes of the additional block object based on user input received in association with an instructional asset;

receive, at the processor, a second block creation input that includes information indicative of the additional block object of the instructional map to be placed at the second sub-slot of the if-then block object; and generate computer-readable instructions for execution of one or more processes of the additional block object, the one or more processes of the additional block object to be executed upon completion of the instructional asset associated with the logic block object according to the condition.

* * * * *